Aug. 30, 1966     A. D. ALTEMILLER     3,270,169
CONTROLLABLE THERMOSTAT HAVING VERNIER CONTROL OVER
A PORTION OF THE TEMPERATURE RANGE
Filed April 13, 1964     2 Sheets-Sheet 1
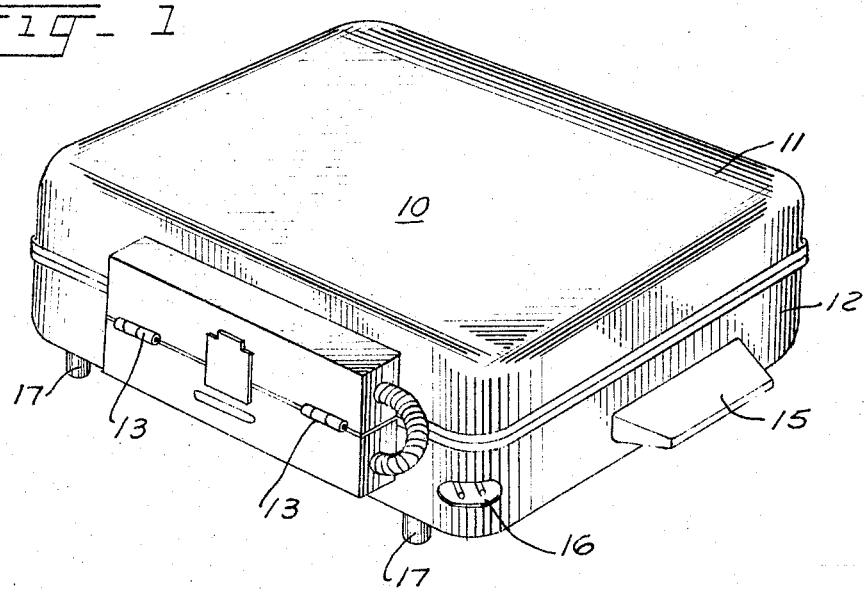
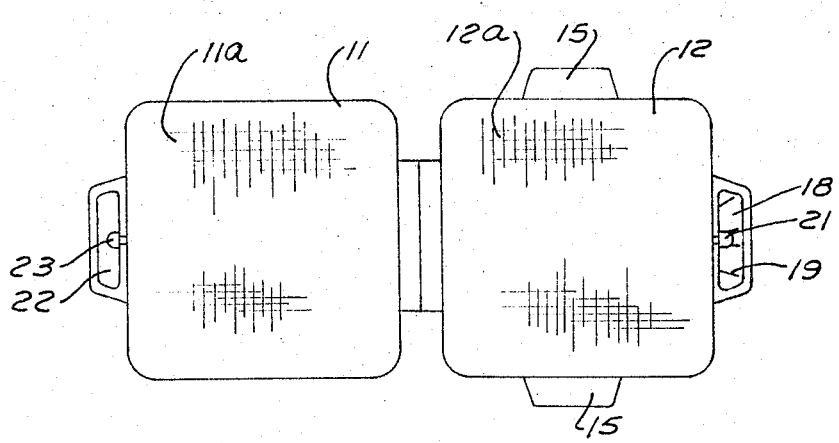
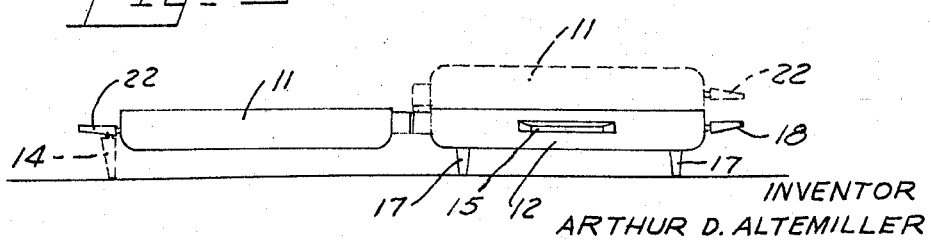
INVENTOR
ARTHUR D. ALTEMILLER
BY Bair, Freeman
& Molinare ATTORNEYS Aug. 30, 1966  A. D. ALTEMILLER  3,270,169
CONTROLLABLE THERMOSTAT HAVING VERNIER CONTROL OVER
A PORTION OF THE TEMPERATURE RANGE
Filed April 13, 1964  2 Sheets-Sheet 2
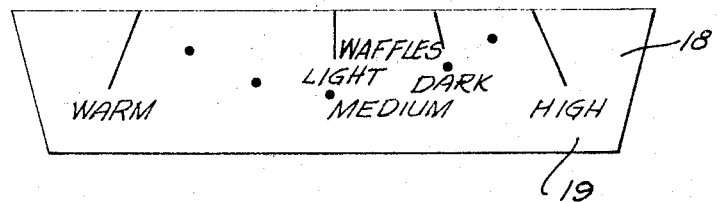
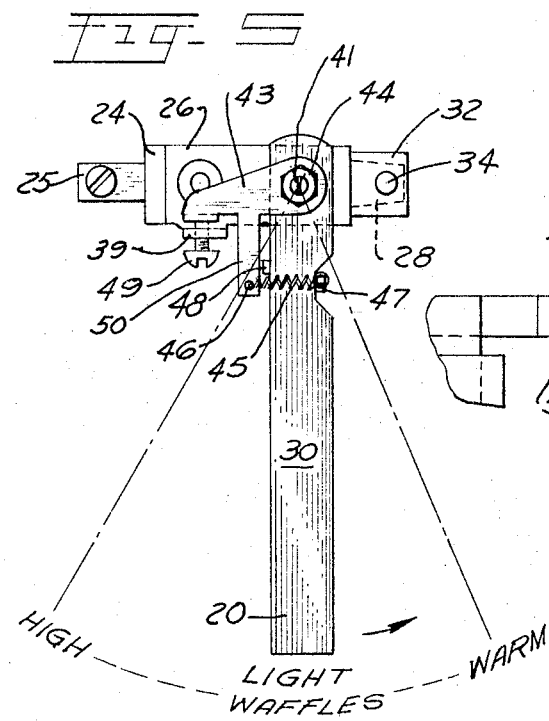
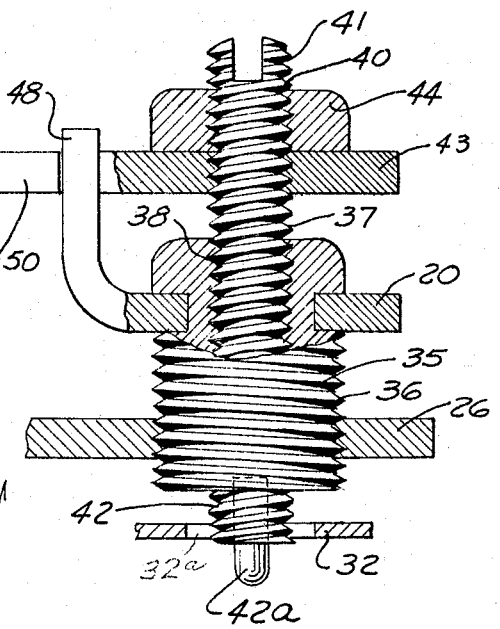
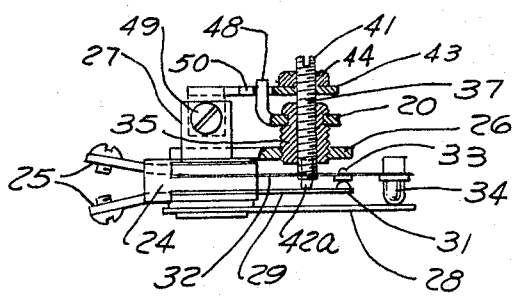
INVENTOR
ARTHUR D. ALTEMILLER
BY
ATTORNEYS United States Patent Office 3,270,169
Patented August 30, 1966

3,270,169
CONTROLLABLE THERMOSTAT HAVING VERNIER CONTROL OVER A PORTION OF THE TEMPERATURE RANGE
Arthur D. Altemiller, St. Louis, Mo., assignor to Knapp-Monarch Company, St. Louis, Mo., a corporation of Delaware
Filed Apr. 13, 1964, Ser. No. 359,074
6 Claims. (Cl. 200—138)

This invention relates to a two-stage thermostat and particularly to a thermostat which is adapted to control heating elements such as used, for example, in a combination waffle iron, sandwich toaster, grill and warming tray appliance.

The invention with respect to the thermostat, while disclosed in connection with the foregoing appliance, is not limited thereto, since the thermostat is usable in a wide variety of applications, for example with other household appliances including a heating element or elements. In such an appliance as the combination waffle iron, sandwich toaster, grill and warming tray, it is desirable to cook waffles, toast sandwiches or grill other foods at a variety of relatively high temperatures so that the product being cooked may be of various degrees of lightness or darkness or may be cooked in various amounts. It is also desirable to be able to maintain food warm with the appliance without appreciably further cooking it.

It is therefore an object of the invention to provide a novel two-stage thermostat which is adjustable to control heating elements throughout one range of cooking temperatures in the usual manner and which, when adjusted to maintain the heating elements at a different temperature range, such as for warming, more rapidly moves the temperature adjustment of the thermostat than the movement thereof for adjusting the temperature of the first mentioned range.

It is another object of the invention to provide a two-stage thermostat which will provide one range of temperatures for heating elements in a substantially uniform progression of temperatures resulting from a single thread movement in the thermostat, and a second range of temperatures in a non-uniform or different rate of progression of temperatures resulting from a double thread movement in the thermostat.

It is also an object of the invention to provide such a two-stage thermostat with separate calibrations for one range of temperatures, for example cooking temperatures, and for a second range of temperatures, such as warming temperatures.

It is still another object of the invention to provide a thermostat which has two or more different rates of temperature change adjustments with one rate of manual control movement; also to provide separate built-in calibrations for each temperature range.

The above and other objects and features of the invention will be more readily apparent from the following description when read in connection with the accompanying drawings, in which:

FIGURE 1 is a perspective view of a combination waffle iron, sandwich toaster, grill and warmer in which my novel thermostat may be used, although as stated it is not limited to use in such an appliance;

FIGURE 2 is a top view of the appliance shown in FIGURE 1 with the halves thereof shown in open position;

FIGURE 3 is a side view of the appliance shown in FIGURE 1 with the halves thereof shown in open position, the dot and dash lines showing the halves closed;

FIGURE 4 is a top view of the plate or dial bearing various legends for association with a control knob associated with a movable control arm;

FIGURE 5 is an elevational view of a thermostat illustrating one embodiment of the invention wherein the thermostat is shown inverted from its normal position in the waffle iron;

FIGURE 6 is a sectional view of a portion of the thermostat in the position it is shown in FIGURE 5; and FIGURE 7 is an enlarged sectional view of the thermostat shown in FIGURE 6.

Referring specifically to the drawings for a detailed description of the invention, numeral 10 designates a combination waffle iron, sandwich toaster, grill and warmer. The appliance 10 comprises two halves 11 and 12 hinged at 13. A leg 14 is shown in FIGURE 3 and cooperates with feet 17 to support the appliance in the open position with the halves 11 and 12 as shown in FIGURES 2 and 3. Handles 15 and a pair of prongs 16 to cooperate with an electrical plug are provided.

As shown in FIGURE 2, the lower half of the appliance 12 is provided with a handle including a dial 18 above which a knob 21 attached to a control lever 20, is provided. The dial 18 is provided with legends 19 as best shown in FIGURE 4 and, for example, may include the words "Waffles," "Light," "Dark" and "Medium" in the central portion thereof, the word "High" adjacent the right hand side of the dial, and the word "Warm" adjacent the left hand side of the dial.

A thermostat generally shown by the numeral 30 is illustrated in FIGURES 5, 6 and 7. The thermostat assembly is generally attached to and senses the temperature of a grid 12a in the lower half of the appliance. A grid 11a is positioned in the top half 11 of the appliance. A dial 22 and a control knob 23 are provided in the top half 11. However, the control for the top grid 11a of the appliance forms no part of the present invention but is a part of the invention in my copending application Serial No. 359,073, filed April 13, 1964, for Combined Waffle Iron and Multiple Heat Warming Appliance and Control Therefor. Furthermore, the heating elements are not shown.

The body or frame portions of the thermostat 24, 26 and 27 are standard, as are the terminals 25 which are fastened to the insulated body portion 24. The body portion 24 of the thermostat which is formed of a block of insulating material also retains a bi-metal strip 28 which moves in response to changes in temperature. Contact switch blades 29 and 32 are also secured to the insulated material 24, the switch blade 32 being the longer of the two. Contacts 31 and 33 are provided upon switch blades 29 and 32 respectively and are adapted to open and close as the bi-metal element 28 moves in response to changes in temperature and thus move an insualted stud 34. One of the switch blades 32 is biased in a direction tending to close the contacts 31 and 33 and the bi-metal element 28 operates against such bias to open the contacts 31 and 33 when the desired temperatures of the grids are reached. Thereafter as the temperature in the lower grid 12a decreases, the bi-metal element 28 moves in the opposite direction to permit the contacts 31 and 33 to again close.

A threaded annular control member 35 having external left hand threads 36 is screwed into the support 26 and has the control arm 20 rigidly secured thereto. The threaded control member 35 is also threaded internally with right hand threads at 38 and a threaded insert or elongated control member 37 having cooperating right hand threads 40 thereon is screwed into the member 35. The threaded member 37 extends out of the threaded annular control member 35 at both ends thereof, as shown at 41 and 42. A tip 42a formed of insulating material is secured, by cementing onto, or by press fit into a recess formed in, the end 42 of control member 35 and contacts the lower switch blade 29 to move it. The blade 32 is provided with a hole 32a to provide for passage therethrough of tip 42a and screw end 42, and for avoiding any electrical contact between blade 32 and control member 37.

A range change arm is shown at 43 and is secured to the internal threaded control member 37 by a lock nut 44, so that after adjustment the arm 43 and nut 44 move together. A spring 45 is connected at 46 to an extension 50 of range change arm 43 and at 47 to control lever 20.

A stop arm 48 is provided on the control lever 20 for a purpose hereinafter described.

*Practical operation*

Assuming that the lever 20 is first in the "High" position, the threaded control member 35 is rotated upwardly in member 26 so that the bi-metal element 28 may maintain contacts 31 and 33 closed until a higher temperature is reached. As the control arm 20 is moved from the "High" position down to the "Light Waffles" position, for example, the threaded control member 35 rotates in the mounting plate 26. Since the control member 35 has a left hand thread on the outside, the movement on the part of the control lever 20 causes contacts 31 and 33 to open at a lower temperature of the grid, since the switch blade 29 is forced downwardly by the tip 42a. During the range of movement of the control arm 20 from "High" down to "Light Waffles," the range change arm 43, the lock nut 44 and the low temperature elongated control member 37 all move to the right as viewed in FIGURE 5 because the spring 45 holds these parts together.

When the control lever 20 is moved further to the right, as viewed in FIGURE 5, to the "Warm" position, the thermostat shifts to double thread operation because the high temperature adjusting screw 49, which is attached to a flange 39 on mounting plate 26, stops the range change arm 43 from moving further with the control arm 20. During this latter range of movement of the control arm 20, spring 45 elongates and the threaded control member 35 threads out of the mounting plate 26 and at the same time threads upward on the low temperature elongated control screw 37, and the low temperature elongated control screw therefor moves downwardly. The result is that between the "Light Waffles" position and the "Warm" position of the control arm 20, any change in thermostat knob 21 positioning affects the position of the insulating tip 42a by the addition of two thread movements, one being the threaded movement of control screw 35 in the mounting plate 26 and the other being the threaded movement of control screw 37 in the threaded control member 35. The effect is that the bi-metal element 28 will cause the contacts 31 and 33 to open at a lower temperature.

When the control arm 20 is returned from the "Light Waffles" position to the "High" position, it rotates the annular control member only in support 26 to raise tip 42a and thus increase the temperature of the grids before contacts 31 and 33 are opened by the bi-metal strip 28. At the same time stop arm 48 contacts the low range control arm 43 and moves it with the control arm 20 so that there is no relative movement between the elongated threaded control member 37 and the annular control member 35. As stated, upon return movement from the "High" to the "Light Waffles" position of the control arm 20, spring 45 retains the parts together and control arm 43 moves with control arm 20, the stop arm 48 being moved back to the position as appears in FIGURE 5 when it is on "Light Waffles."

To calibrate the thermostat both the low temperature threaded control member 37 and the screw 49 must be adjusted. The low temperature range should be calibrated first and in order to accomplish such calibration the lock nut 44 should be loosened slightly and the low temperature threaded control member 37 should be adjusted until the bottom grid temperature stabilizes at 175° F. with the appliance in full open position as shown in FIGURE 2, and with the control knob 21 positioned at the "Warm" marking on the control dial 18. The second adjustment is to calibrate the high temperature setting. This is accomplished by positioning the thermostat knob 21 at the "Medium Waffles" position on dial 18 and then adjusting the high temperature adjusting screw 49 until the waffle grids' temperature stabilizes at approximately 440° F. with the two halves closed as shown in FIGURE 1. The point along the dial 18 where the thermostat shifts to double threaded operation is approximately at the "Light Waffles" position, the exact point of shifting varying slightly depending upon minor tolerance variations in the component parts.

From the foregoing it will be apparent that I have provided a novel two-stage thermostat which is applicable to a variety of control purposes, which provides one range of temperatures in a substantially uniform progression of temperatures and a second range of temperatures in a non-uniform or different rate of progression of temperatures. The thermostat provides two or more different rates of temperature change adjustments with one rate of manual control movement. It also provides readily adjustable built in calibrations for each temperature range.

It is to be understood that it is possible to change the threads' combination in such a manner to obtain temperatures along the dial 18 to reverse their direction after the thermostat has shifted into its second stage or double threaded stage of movement. It is also possible to add a third or fourth threaded position to make possible a three-stage or four-stage thermostat or any number of stages desired.

Also threads of the same pitch or different, both right or both left, may be utilized depending on the result desired. In fact any arrangement which results in one thread movement for a part of the travel of control arm 20 and a double thread movement for another part of said travel is contemplated in practicing my invention.

While one embodiment of the invention has been shown and described herein, it will be understood that it is illustrative only and not to be taken as a definition of the scope of the invention, reference being had for this purpose to the appended claims.

I claim as my invention:

1. A thermostat controlled switch comprising, in combination, a pair of contact arms having contacts thereon, support means for mounting said contact arms to permit relative motion of said contacts between an open and a closed position, a first one of said contact arms being biased toward one of said contact positions, a thermostatically controlled member positioned to engage with and move said first contact arm against said bias to the other contact position, an annular adjustment screw having screwed engagement with a fixed threaded support, an elongated adjustment screw having a central portion thereof in screwed engagement in said annular adjustment screw and having both ends thereof extending axially outwardly of the annular adjustment screw, one end of said elongated adjustment screw engaging the other contact arm to vary and thereby adjust the position of the contact thereon, a first control arm connected with said annular adjustment screws to move the same through a predetermined range of travel, means for causing said elongated screw to rotate with said annular screw through a first portion of said range of travel, and means for preventing mutual rotation of said screws through a remaining portion of said range of travel.

2. A thermostat controlled switch comprising, in combination, a pair of contact arms having contacts thereon, support means for mounting said contact arms to permit relative motion of said contacts between an open and a closed position, a first one of said contact arms being biased toward one of said contact positions, a thermostatically controlled member positioned to engage with and move said first contact arm against said bias to the other contact position, an annular adjustment screw having screwed engagement with a fixed threaded support, an elongated adjustment screw having a central portion thereof in screwed engagement in said annular adjustment screw and having both ends thereof extending axially outwardly of the annular adjustment screw, one end of said elongated adjustment screw engaging the other contact arm to vary and thereby adjust the position of the contact thereon, a first control arm connected with one of the adjustment screws to move the same, a second control arm connected to the other of said adjustment screws to move the same, said first control arm moving alone through a portion of its travel to rotate the annular screw and through another portion of its travel moving both the annular adjustment screw and the elongated adjustment screw at the same time, means for adjusting the relative positions of said control arms to change the point at which the control arms effect movement of both the annular adjustment screw and the elongated adjustment screw at the same time, and means for adjusting the elongated adjustment screw relative to the annular adjustment screw.

3. A thermostat controlled switch comprising, in combination, a pair of contact arms having contacts thereon, support means for mounting said contact arms to permit relative motion of said contacts between an open and a closed position, a first one of said contact arms being biased toward one of said contact conditions, a thermostatically controlled member positioned to engage with and move said first contact arm against said bias to the other contact position, an annular adjustment screw having screwed engagement with a fixed threaded support, an elongated adjusting screw having a central portion thereof in screwed engagement in said annular adjustment screw and having both ends thereof extending axially outwardly of the annular adjusting screw, one end of said elongated adjusting screw engaging the other contact arm to vary, and thereby adjust the position of the contact thereon, the threads on the outside of said annular adjustment screw and the threads on the interior thereof being of opposite hands, a control arm connected with one of the adjustment screws to move the same, a second control arm connected to the other of said adjustment screws to move the same, resilient means connecting said first and second control arms, and a stop for said second control arm positioned so that the second control arm moves with the first control arm through a portion of the travel of the first conrol arm due to said resilient connection and does not move with the first control arm during another portion of its travel after it engages with said stop but elongates said resilient means, whereby only one of the screws is rotated during the first mentioned part of the travel of the first control arm and both screws are rotated during the remainder of the travel of the control arm to thereby rapidly move said one end of the adjusting screw which engages said other contact arm toward or away therefrom, said rapid movement being caused by the combination of said right and left hand threads on said annular adjustment screw and said elongated adjustment screw, means for varying the position of said elongated adjustment screw and means for varying the travel of said second control arm before it reaches said stop, said last two means affording calibration of two ranges of the thermostat.

4. In combination with a thermostatically controlled switch having at least a pair of electrical contacts wherein the position of one of said contacts determines the temperature at which switching occurs, an arrangement for varying the position of said one contact which comprises, in combination,
an annular adjustment screw having inside and outside threaded surfaces,
a fixed threaded support engaged with said outside threaded surface of said annular screw,
an elongated inner screw having at least a central portion thereof in threaded engagement with the inside threaded surface of said annular screw,
the threads of said inner screw and the threads on the outer surface of said annular screw being of the opposite hand such that clockwise rotation of said inner screw with respect to said annular screw viewed from a given point moves said inner screw in a first axial direction while clockwise rotation of said annular screw with respect to said thread support again viewed from said given point moves said annular screw in the opposite axial direction,
a control member affixed to said annular screw for rotating said annular screw through a predetermined range of travel,
means for causing said inner screw to rotate with said annular screw through a first portion of said range of travel,
means for preventing mutual rotation of said screws through a remaining portion of said range of travel,
and means for altering the position of said one contact in response to axial movement of said inner screw to vary the switching temperature of said thermostatically controlled switch.

5. An arrangement as set forth in claim 4 wherein said means for causing said inner screw to rotate with said annular screw comprises, in combination,
a second control member affixed to said inner screw and resilient linkage means connecting said control members.

6. An arrangement as set forth in claim 5 wherein said means for preventing mutual rotation of said screws comprises an adjustable stop positioned to engage said second control member at a predetermined angular position to prevent further rotation of said inner screw as said annular screw is rotated.

References Cited by the Examiner
UNITED STATES PATENTS 2,741,682  4/1956  Schwaneke et al. _____ 200—139
2,901,578  8/1959  Noakes _____ 200—139

BERNARD A. GILHEANY, *Primary Examiner.*

L. A. WRIGHT, *Assistant Examiner.*